United States Patent [19]

Jepsen

[11] Patent Number: 4,524,399
[45] Date of Patent: Jun. 18, 1985

[54] MAGNETIC DISK MEMORY POWER SUPPLY

[75] Inventor: David B. Jepsen, San Jose, Calif.

[73] Assignee: Tandon Corporation, Chatsworth, Calif.

[21] Appl. No.: 384,428

[22] Filed: Jun. 2, 1982

[51] Int. Cl.³ .............. G11B 5/012; G11B 5/45; G05B 19/40; G04B 19/00
[52] U.S. Cl. .................. 360/97; 318/696; 360/106; 368/76
[58] Field of Search ............ 360/106, 99, 78, 97; 318/696, 685, 130; 368/76

[56] References Cited

U.S. PATENT DOCUMENTS

| | | | |
|---|---|---|---|
| 4,112,345 | 9/1978 | Goddijn | 318/696 |
| 4,139,877 | 2/1979 | Townsend | 360/106 |
| 4,238,717 | 12/1980 | Knight | 318/696 |
| 4,313,143 | 1/1982 | Zarr | 360/106 |
| 4,315,290 | 2/1982 | Kukreja | 360/106 |
| 4,340,946 | 7/1982 | Kanno | 368/76 |

*Primary Examiner*—Robert M. Kilgore
*Attorney, Agent, or Firm*—Fraser and Bogucki

[57] ABSTRACT

In a magnetic disk memory, a magnetic disk is driven by a DC motor having a permanent magnet rotor and a pair of stator windings sharing a common ground connection point. The windings are alternately energized from an electrical power source by a switching circuit which produces positive voltage pulses of predetermined duration across the windings. The negative emf induced in the windings between energizing pulses provides a source of regulated, negative DC voltage which may be used to power various components requiring such a supply.

6 Claims, 2 Drawing Figures

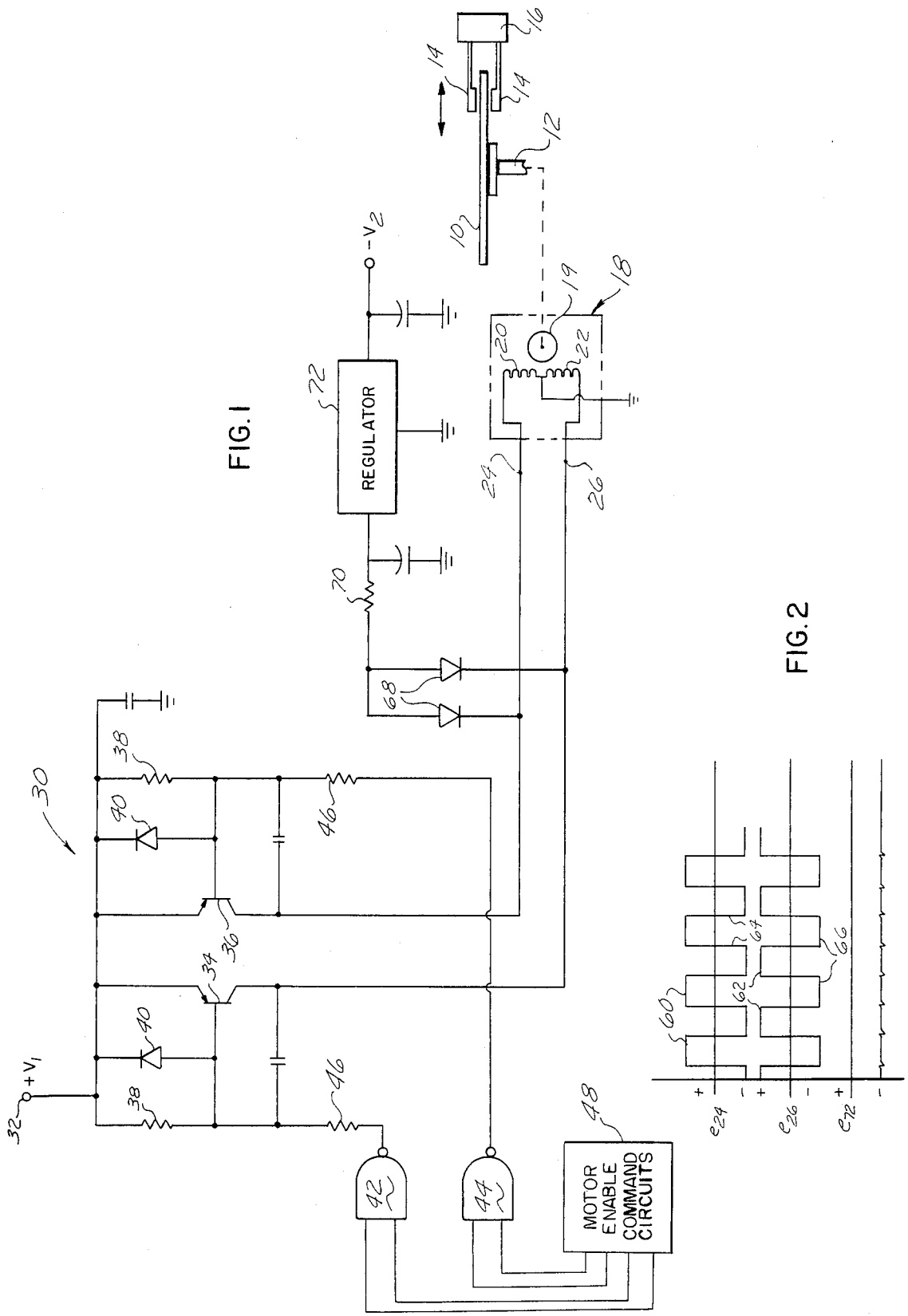

MAGNETIC DISK MEMORY POWER SUPPLY

FIELD OF THE INVENTION

This invention relates generally to magnetic disk memories and in particular to self-contained power supplies for use in such memories.

BACKGROUND OF THE INVENTION

DC power supplies incorporated in magnetic disk memories have been for the most part standardized at +5 and +12 volts. Thus, typically no provision is made for an onboard negative voltage source despite the frequent need therefor to power integrated circuit devices such as analog-to-digital converters, random access memories and operational amplifiers calling for bipolar supply voltages. Where negative voltages are required, switching power supplies external to the disk memory device are usually employed to convert an existing positive voltage. However, such supplies require components such as choppers, transformers and rectifiers as well as filter and regulator stages which tend to be both bulky and expensive. Moreover, they often generate electrical noise which can interfere with the operation of other components and adversely affect the data transfer function of the disk memory.

SUMMARY OF THE INVENTION

Pursuant to the broad aspects of the present invention, there is provided a magnetic disk memory having at least one magnetic disk driven by a DC spindle motor comprising a permanent magnet rotor and a pair of stator windings sharing a common ground connection point. The windings are alternately energized from an electrical power source by a switching circuit which produces positive voltage pulses of predetermined duration across the windings. The negative emf induced in the windings between energizing pulses is used as a source of regulated, negative DC voltage for powering various components requiring such a supply.

BRIEF DESCRIPTION OF THE DRAWINGS

A better understanding of the present invention may be had from the detailed description below read in conjunction with the accompanying drawings in which:

FIG. 1 is a schematic of a portion of a magnetic disk drive including a spindle motor-energizing circuit embodying the present invention; and FIG. 2 shows a series of voltage waveforms appearing at various points in the circuit of FIG. 1.

DETAILED DESCRIPTION OF THE PREFERRED EMBODIMENT

FIG. 1 shows in diagrammatic form a magnetic disk 10 mounted for rotation on a spindle 12, electromagnetic transducer heads 14 for writing and reading data onto and off the opposite magnetic surfaces of the disk 10, and a movable head support mechanism 16 for radially positioning the read/write heads in relation to a series of concentric data tracks on the surfaces of the disk 10.

The disk 10 is rotated at constant speed by a DC motor 18 having a permanent magnetic rotor 19 connected to the spindle 12 and a pair of field or stator windings 20 and 22 having supply terminals 24 and 26, respectively, and a common ground connection 28.

The motor 18 is energized and its speed held constant by means of voltage pulses of controlled duration applied to the windings 20 and 22. Generally, a power switching circuit 30 alternately connects the motor terminals 24 and 26 to a power supply 32 (having a voltage $+V_1$, typically +12 volts) in response to input signals which control the switching times or duty cycle of the circuit 30 and threby the average voltage across the motor windings. More particularly, the power switching circuit includes a pair of PNP power transistors 34 and 36, preferably of the Darlington type, having their collectors coupled to the motor winding terminals 24 and 25, respectively, and their emitters connected to the supply 32. Resistors 38 and protective diodes 40 couple the base terminals of transistors 34 and 36 to the supply 32.

The switching times of the transistors 34 and 36 and hence the timing and width of the voltage pulses applied to the motor windings are controlled by logic elements in the form of a pair of NAND gates 42 and 44 whose outputs, connected to the base terminals of the transistors 34 and 36 through current limiting resistors 46, provide sufficient base drive to operate the transistors in a switching mode. The inputs of the gates 42 and 44 are connected to appropriate motor enable command circuits 48 that may include a microprocessor which in turn is responsive to various inputs including, for example, signals representing actual motor speed and the instantaneous angular position of the rotor 19. Various command circuits for energizing the motor by way of pulse width modulated signals are known in the art and need no elaboration here. Suffice it to say that the outputs of the NAND gates 42 and 44 are alternately switched to their low states for predetermined durations thereby causing one or the other of the transistors 34 or 36 to go into saturation. The width or duration of these pulses may be varied in several ways to control the average voltage applied to the windings. For example, the position of the leading edge of the pulses may be held constant while that of the trailing edge varied in accordance with speed and rotor position information acquired during a preceding interval. A brief delay may be introduced between successive pulses to preclude simultaneous energization of both motor windings.

FIG. 2 shows the voltage waveforms $e_{24}$ and $e_{26}$, in idealized form, appearing at motor terminals 24 and 26, respectively, and it will be seen that positive pulses 60 applied across the winding 20 alternate with like, positive pulses 62 applied across the winding 22. During the interval that one or the other power transistor 34 or 36 is in the off state, a voltage is induced in the corresponding winding 20 or 22 by virtue of the combined generator action of the rotor 19 and the flux developed by the other, energized winding. The voltages thus induced, shown as portions 64 and 66 of the waveforms $e_{24}$ and $e_{26}$, respectively, have negative polarities and their magnitudes approximate that of the positive energizing pulses. In accordance with the invention, the negative voltages induced in the windings between energizing pulses are used as a source of negative DC potential. Thus, a pair of parallel diodes 68, poled as shown to conduct during those intervals that the motor terminals go negative, couple the motor terminals through a current limiting resistor 70 to an appropriately filtered voltage regulator 72 having a regulated output $-V_2$, for example, −5 volts. The diodes 68 alternately conduct and a relatively constant, negative potential appears at the input of the regulator 72 as shown by the waveform $e_{72}$ in FIG. 2. The device 72 is a low cost, commercially available regulator (for example, type MC79L05) capable of precisely sensing and holding the output voltage.

A single embodiment of the invention has been described in detail and will suggest to those skilled in the art many applications as well as appropriate modifications and equivalent arrangements all of which are intended to be covered by the appended claims.

What is claimed is:

1. A magnetic disk memory apparatus including:
   a rotatable magnetic disk;
   a transducer operatively associated with the disk for transferring data signals to and from the disk;
   a motor for rotating the disk, the motor having terminals;
   means for applying electrical energizing pulses to the motor terminals, voltages induced by the action of the motor appearing at the terminals between energizing pulses; and
   means for conditioning the induced voltages to provide an output usable as a source of electrical power for various electrical components of the disk memory apparatus.

2. A magnetic disk memory apparatus, as defined in claim 1, in which:
   the applied and induced voltages are of opposite polarities.

3. A magnetic disk memory apparatus, as defined in claim 1, in which:
   a conditioning means includes rectifier, regulator and filter elements.

4. A magnetic disk memory apparatus including:
   a rotatable magnetic disk;
   a transducer operatively associated with the disk for transferring data signals to and from the disk;
   a motor for rotating the disk, the motor including a rotor, a pair of stator windings and a pair of terminals, each winding having an end connected to one of the motor terminals and another end connected to ground;
   means for applying a succession of positive polarity energizing pulses alternately to the motor terminals, a negative voltage being induced in each motor winding between applied pulses; and
   means connected to the motor terminals and responsive to the induced voltages for providing a stable, negative DC output voltage for powering various electrical components of the disk memory apparatus.

5. A magnetic disk memory apparatus, as defined in claim 4, in which:
   the last-mentioned means includes a filtered regulator circuit and rectifier means coupling the regulator circuit to the motor terminals.

6. A magnetic disk memory apparatus including:
   a rotatable magnetic disk;
   a transducer operatively associated with the disk for transferring digital data to and from the disk;
   a motor for rotating the disk at a substantially constant speed, the motor including a rotor and first and second stator windings, the first winding having one end connected to a first motor terminal and another end connected to ground and the second winding having one end connected to a second motor terminal and another end connected to ground;
   a power source for supplying a positive DC voltage;
   a first electronic switch for selectively connecting the voltage source to the first motor terminal;
   a second electronic switch for selectively connecting the voltage source to the second motor terminal;
   means connected to the electronic switches for controlling the switches to alternately energize the windings for predetermined durations, induced voltages of negative polarity appearing at the terminals between energizing pulses;
   a voltage regulator for providing a stable, negative DC output; and
   first and second rectifiers connecting the regulator with the first and second motor terminals, respectively, and poled to conduct when negative voltage appears at the motor terminals, said negative output comprising a power source for various electrical components of the disk memory apparatus.

* * * * *